(12) United States Patent
Matsuo et al.

(10) Patent No.: US 9,327,790 B2
(45) Date of Patent: May 3, 2016

(54) VEHICLE BODY FRAME FOR A SADDLE-RIDE VEHICLE, AND MOTORCYCLE INCLUDING SAME

(71) Applicant: HONDA MOTOR CO., LTD., Minato-Ku, Tokyo (JP)

(72) Inventors: Tomoya Matsuo, Wako (JP); Yusuke Inoue, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 14/666,572

(22) Filed: Mar. 24, 2015

(65) Prior Publication Data

US 2015/0274241 A1 Oct. 1, 2015

(30) Foreign Application Priority Data

Mar. 28, 2014 (JP) ................................. 2014-068920

(51) Int. Cl.
| B62K 11/00 | (2006.01) |
|---|---|
| B62K 19/00 | (2006.01) |
| B62K 11/04 | (2006.01) |
| B62K 19/12 | (2006.01) |
| B62K 19/20 | (2006.01) |
| B62K 19/32 | (2006.01) |

(52) U.S. Cl.
CPC ................. *B62K 11/04* (2013.01); *B62K 19/12* (2013.01); *B62K 19/20* (2013.01); *B62K 19/32* (2013.01)

(58) Field of Classification Search
CPC ........ B62K 11/00; B62K 19/00; B62K 19/20; B62K 19/30; B62K 19/32; B62K 21/18; B62K 2202/00
See application file for complete search history.

(56) References Cited

U.S. PATENT DOCUMENTS

| 4,887,687 | A * | 12/1989 | Asai et al. ...................... 180/219 |
|---|---|---|---|
| 4,989,665 | A * | 2/1991 | Yamagiwa et al. ........... 164/363 |
| 6,270,104 | B1 * | 8/2001 | Nelson et al. ............... 280/281.1 |
| 6,481,522 | B1 * | 11/2002 | Adachi .......................... 180/219 |
| 7,383,909 | B2 * | 6/2008 | Kawase ........................ 180/219 |
| 7,849,947 | B2 * | 12/2010 | Morita .......................... 180/219 |
| 8,668,218 | B2 * | 3/2014 | Toda et al. ................. 280/281.1 |
| 8,684,388 | B1 * | 4/2014 | Teixeira ..................... 280/281.1 |
| 2002/0059728 | A1 * | 5/2002 | Mochizuki et al. .......... 29/897.2 |
| 2009/0071741 | A1 * | 3/2009 | Ono et al. ..................... 180/219 |
| 2009/0224507 | A1 * | 9/2009 | Hu ................................ 280/279 |
| 2013/0026733 | A1 * | 1/2013 | Oe et al. ..................... 280/281.1 |

FOREIGN PATENT DOCUMENTS

| JP | 2000-006869 A |   | 1/2000 |
|---|---|---|---|
| JP | 2006015838 A | * | 1/2006 |

* cited by examiner

*Primary Examiner* — Joseph Rocca
*Assistant Examiner* — Marc A Scharich
(74) *Attorney, Agent, or Firm* — Carrier Blackman & Associates, P.C.; Joseph P. Carrier; Anne G. Sabourin

(57) ABSTRACT

To provide a vehicle body frame for a motorcycle which includes a head pipe having good dimensional accuracy. A head pipe includes a left half which is obtained by die forming, a right half which is obtained by die forming, and beads with which the right half is integrated with the left half by laser welding. The head pipe is formed by joining the left half and the right half to each other with the first and second beads which are laser weld beads. Laser weld beads are significantly smaller in bead width than arc weld beads, and therefore their shrinkage after their solidification is significantly smaller. As a result, a head pipe having good dimensional accuracy is obtained.

20 Claims, 14 Drawing Sheets

VEHICLE BODY FRAME FOR A SADDLE-RIDE VEHICLE, AND MOTORCYCLE INCLUDING SAME

CROSS-REFERENCE TO RELATED APPLICATIONS

The present invention claims priority under 35 USC 119 based on Japanese Patent Application No. 2014-068920, filed on 28 Mar. 2014. The entire subject matter of this priority document, including specification claims and drawings thereof, is incorporated by reference herein.

BACKGROUND OF THE INVENTION

1. Field of the Invention

The present invention relates to a vehicle body frame for a saddle-ride vehicle, which may be a motorcycle, and to a motorcycle including the vehicle body frame.

2. Description of the Background Art

In many cases, body frames for motorcycles and other saddle-ride vehicles are manufactured by welding together pipe materials having tubular frames.

Among the known welding methods, arc welding has mainly been used. In recent years, however, laser welding has become common, and has been employed for manufacturing some motorcycle body frames (see, for example, FIGS. 5 and 7 of Patent Document 1).

FIG. 5(A) of Patent Document 1 shows part of a vehicle body frame, which is formed by arranging pipe materials (P1 to P4) (the numbers in parenthesis represent the reference numerals from the cited document; the same applies below) facing towards each other, and then laser-welding their facing portions.

For example, each pipe material (P2) is laser-welded to a pipe material (P1) with a predetermined gap (clearance) therebetween. The end of the pipe material (P1) and the end of the pipe material (P2) are melted by the heat of the laser beam, and then solidified and joined to each other. In this solidification, the molten metal shrinks. Thus, though slightly, the longitudinal dimensions (the lengths in the vehicle length direction) of the pipe material (P1) and the pipe material (P2) shrink. The degree of this shrinkage differs depending on the conditions, thereby causing great variation. Since there are three welding spots (on each side), the longitudinal dimension varies to an unacceptably large extent.

The consequence is that the distance between each reinforcing member (q) and a head pipe shown in FIG. 7 of Patent Document 1 differs from one vehicle body frame to another. A structure is desired which is capable of suppressing the change in the length of a vehicle body frame in the vehicle length direction that occurs during the welding thereof.

Further, in the case of a two- or three-wheeled vehicle, large force (reactive force from a road surface or steering force) is applied to its head pipe through its steering shaft. The head pipe is what is called a strength member and is required to be sufficiently strong.

Since, as noted, they are required to be strong, head pipes have heretofore only rarely been manufactured as a divided structure. In the manufacturing of a one-piece head pipe by casting or forging, it is difficult to form a hollow part in which to insert a steering shaft, and the head pipe is likely to be thick as a whole. Thus, it has been difficult to reduce the weight of the head pipe.

One may conceive of a structure in which a head pipe is formed as a divided structure, and the divided halves are joined together with bolts. In such case, however, it is necessary to extend flanges from the divided halves and also to join the flanges together with bolts. This increases the weight.

To satisfy demands for dimensional accuracy improvement and weight reduction, a vehicle body frame has been desired which has good dimensional accuracy in the vehicle length direction and includes a head pipe which is relatively light in weight.

[Patent Document 1] Japanese Patent Application Publication No. 2000-6869

SUMMARY OF THE INVENTION

Reference numbers are included in the following description corresponding to the reference numbers used in the drawings. Such reference numbers are provided for purposes of illustration, and are not intended to limit the invention.

An object of the present invention is to provide a vehicle body frame for a two-wheeled vehicle which has good dimensional accuracy in the vehicle length direction and includes a head pipe capable of weight reduction.

A first aspect of the present invention provides a vehicle body frame for a saddle-ride vehicle, including: a head pipe on which a steering shaft for steering a front wheel is pivotally supported; a main frame which is welded to the head pipe at a front end and extends toward a rear of the vehicle; and a pivot frame which is connected to a rear portion of the main frame at a front end and extends toward the rear of the vehicle, and on which a rear wheel is supported vertically movably through a pivot shaft, in which the head pipe includes a left half which is obtained by die forming, a right half which is obtained by die forming, and a bead with which the right half is integrated with the left half by laser welding, and the left and right halves respectively include left and right main frame support sockets in which a tip of the main frame is capable of being inserted, and left and right steering support sleeves which support the steering shaft, the left and right main frame support sockets and the left and right steering support sleeves being formed altogether in the die forming.

In a second aspect of the present invention, the left and right halves are cast parts.

In a third aspect of the present invention, the left and right halves are forged parts.

In a fourth aspect of the present invention, the left and right halves have hollow portions formed on a joining surface side.

In a fifth aspect of the present invention, the main frame includes a left main frame and a right main frame, the left main frame support socket provided to the left half has a left insertion hole in which a tip of the left main frame is capable of being inserted from the rear of the vehicle, and the right main frame support socket provided to the right half has a right insertion hole in which a tip of the right main frame is capable of being inserted from the rear of the vehicle.

In a sixth aspect of the present invention, the left and right halves include left and right square-U-shaped cross-section parts in lower sections thereof, respectively, and a downframe support socket in which a tip of a down frame is capable of being inserted and supported is capable of being formed by bringing the right square-U-shaped cross-section part into contact with the left square-U-shaped cross-section part and joining the right square-U-shaped cross-section part to the left square-U-shaped cross-section part by laser welding.

According to the first aspect of the present invention, the left and right halves, which are obtained by die forming, are integrated with each other by laser welding to thereby obtain the head pipe. Since they are integrated by welding, there is no need for flanges for connecting them to each other with bolts.

Thus, the weight of the head pipe can be reduced. Since each half is obtained by die forming, the half has an appropriate thickness and does not need to be thick. Thus, the weight of the head pipe can be reduced.

In addition, in the welding, the molten metal solidifies and shrinks. Here, since the left and right halves are joined, shrinkage occurs in the vehicle width direction, but shrinkage does not occur in the vehicle length direction. As a result, the dimensional accuracy of the vehicle body frame in the vehicle length direction can be enhanced.

Note that as compared to arc welding (including TIG welding and MIG welding), laser welding has an extremely higher energy density and therefore a significantly greater bead (fused metal) aspect ratio (depth/width). Since the bead depth is large, sufficient joint strength can be ensured. Since the bead width is small, the degrees of the solidification and shrinkage are relatively small.

Accordingly, the head pipe can ensure sufficient rigidity despite that it is formed by joining the divided halves by welding.

According to the second aspect of the present invention, the left and right halves are cast parts. By devising their dies, it is possible to easily make complicated shapes and form hollow portions. Thus, the weight of the head pipe can be reduced further.

According to the third aspect of the present invention, the left and right halves are forged parts. The shapes of the forged parts are limited as compared to the cast parts. However, it is possible to obtain higher strength than that of the cast parts. Thus, the thickness can be reduced, and hollow portions can be formed as well. Accordingly, the weight of the head pipe can be reduced further.

According to the fourth aspect of the present invention, the left and right halves have the hollow portions formed on the joining surface side. Since the hollow portions are not visible on any exterior portions, the exterior appearance of the head pipe can be enhanced.

According to the fifth aspect of the present invention, the main frame includes the left and right main frames, and the left and right main frame support sockets have the left and right insertion holes in which the tips of the left and right main frames are capable of being inserted from the rear of the vehicle, respectively. Since the left and right main frames are capable of being inserted in the left and right insertion holes and welded thereto, the manufacturing is easier. Thus, the manufacturing time can be shortened.

According to the sixth aspect of the present invention, the left and right halves include the left and right square-U-shaped cross-section parts in the lower sections thereof, respectively, and the down-frame support socket in which the tip of the down frame is capable of being inserted and supported is capable of being formed by bringing the right square-U-shaped cross-section part into contact with the left square-U-shaped cross-section part and joining the right square-U-shaped cross-section part to the left square-U-shaped cross-section part by laser welding.

The square-U-shaped cross-section parts can be manufactured by casting or welding. When the two square-U-shaped cross-section parts are brought into contact with each other and laser-welded to each other, the down-frame support socket having a rectangular cross section is obtained. Here, since the joining method is laser welding, the welding distortion is small. Thus, a down-frame support socket having a good final shape can be obtained easily. As a result, the positional accuracy of the down frame is improved.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 9B shows a view of formation of a first bead having a large aspect ratio.

DETAILED DESCRIPTION OF ILLUSTRATIVE EMBODIMENTS

A number of selected illustrative embodiments of the present invention will be described in detail herein, with reference to the accompanying drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention. Reference numbers used herein having suffixes of "L" or "R" generally represent left and/or right components.

Figure 1:
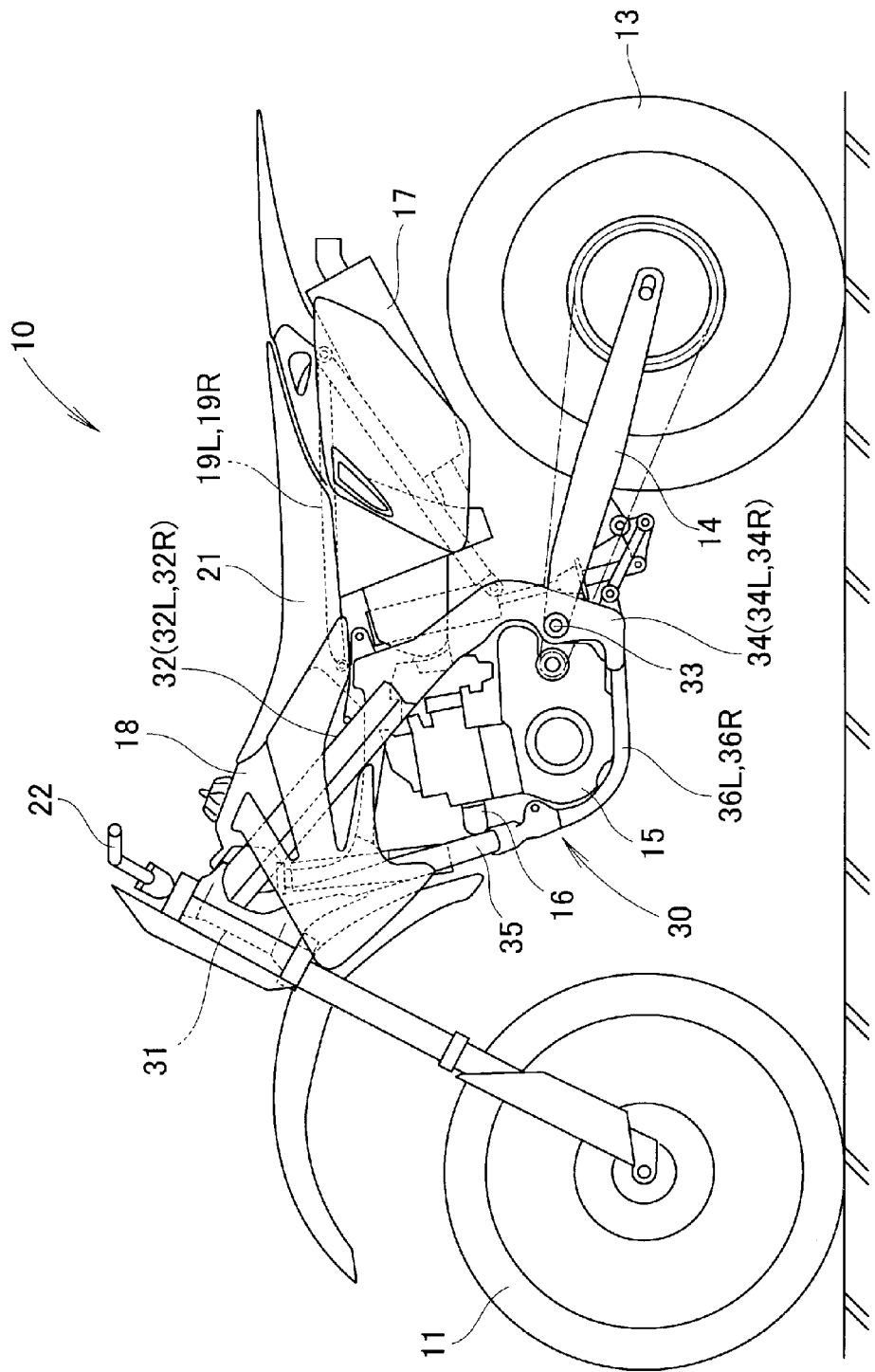
FIG. 1 is a left-side view of a motorcycle according to the present invention.

As shown in FIG. 1, a motorcycle 10 includes, as one of its main parts, a vehicle body frame 30 including: a head pipe 31 on which a steering shaft 12 for steering a front wheel 11 is pivotally supported; a main frame 32 welded to this head pipe 31 at the front end and extending toward the rear of the vehicle; and a pivot frame 34, having a front end connected to a rear portion of this main frame 32, and extending toward the rear of the vehicle.

The pivot frame 34 is provided with a pivot shaft 33. A swing arm 14 is pivotally attached to this pivot shaft 33. A rear wheel 13 is rotatably attached to the rear portion of the swing arm 14.

In this embodiment, the main frame 32 includes both a left main frame 32L and a right main frame 32R Left and right pivot frames 34L, 34R are connected to the rear portions of the left and right main frames 32L, 32R, respectively. Note that the main frame 32 may be a so-called center frame with a structure which is a single longitudinal frame extending along the center in the vehicle width direction.

Preferably, a space for housing an engine 15 is formed by extending a down frame 35 downward from the head pipe 31, extending left and right lower frames 36L, 36R toward the rear of the vehicle body from a lower portion of this down frame 35, and connecting the left and right lower frames 36L, 36R to the left and right pivot frames 34L, 34R, respectively.

The engine 15 is supported on the vehicle body frame 30 in such a way as to be housed in this space formed therein, and an exhaust pipe 16 is extended from the engine 15. This exhaust pipe 16 is extended toward the rear of the vehicle by passing a lateral side (the right side in this example) of the engine 15. A silencer 17 is attached to a rear portion of the exhaust pipe 16.

Moreover, a fuel tank 18 is attached behind the head pipe 31 and between the left and right main frames 32. Seat frames 19L, 19R are extended from the rear portions of the main frames 32L, 32R or from upper portions of the pivot frames 34L, 34R, respectively. A seat 21, for the vehicle operator to sit on, is placed on the seat frames 19L, 19R and supported on the seat frames 19L, 19R.

Figure 2:
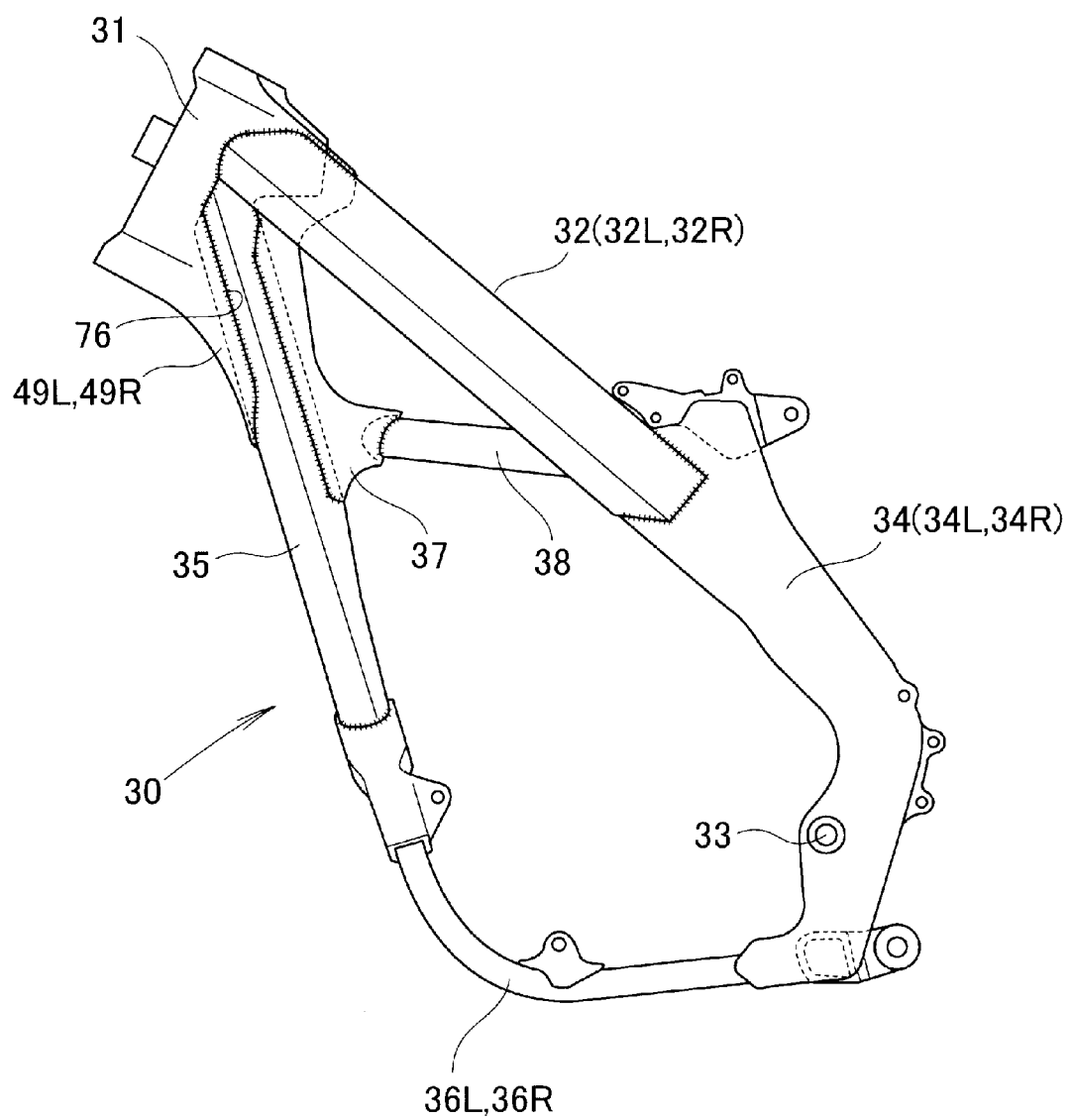
FIG. 2 is a view showing the vehicle body frame of the motorcycle according to the present invention.

As shown in FIG. 2, the vehicle body frame 30 includes: the head pipe 31; the left and right main frames 32L, 32R extending toward the rear of the vehicle from the head pipe 31; the left and right pivot frames 34L, 34R extending downward from the rear portions of the main frames 32L, 32R; the down frame 35 extending obliquely downward from the head pipe 31; the lower frames 36L, 36R extending from the rear portion of the down frame 35 and connected to the pivot frames 34L, 34R; and a reinforcing pipe 38, connected to the down frame 35 through a gusset 37, and extending toward the rear of the vehicle body along the center of the vehicle body.

Figure 3:
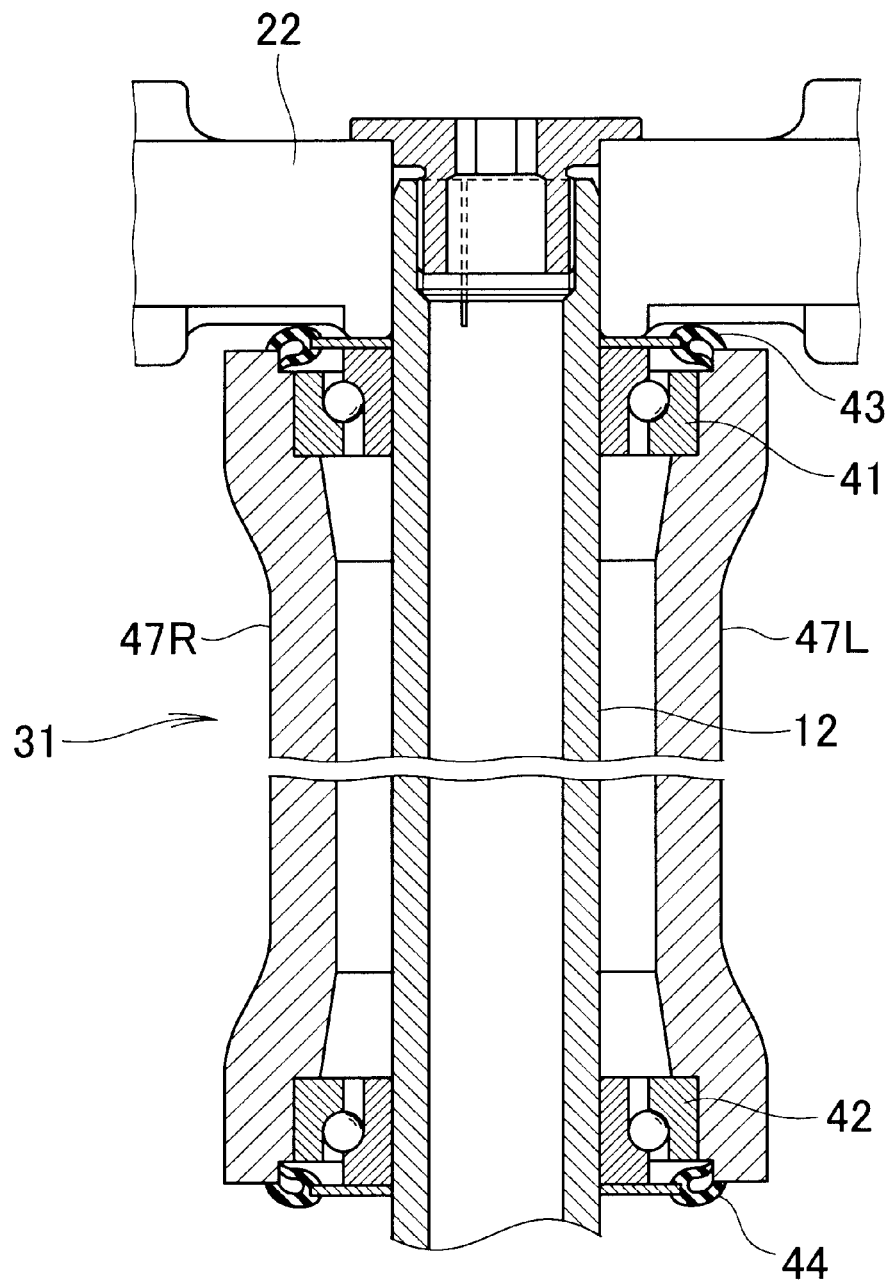
FIG. 3 is a cross-sectional view of a head pipe.

As shown in FIG. 3, an upper bearing 41 and a lower bearing 42 are fitted between left and right steering support sleeves 47L, 47R of a head pipe 31, and the steering shaft 12 is pivotally (turnably) attached to the left and right steering support sleeves 47L, 47R through the bearings 41, 42.

The upper bearing 41 is covered by an upper seal member 43 from above, while the lower bearing 42 is covered by a lower seal member 44 from below. In this way, foreign materials, such as dirt and water, are prevented from entering the bearings 41, 42 from the outside.

A steering handlebar 22 is attached to an upper portion of the steering shaft 12. The steering shaft 12 is turned as the vehicle operator turns the steering handlebar 22. The front wheel 11 shown in FIG. 1 is operatively attached to a lower end of the steering shaft 12, and the front wheel 11 receives a reactive force (such as upward force) from a road surface. Thus, the head pipe 31 is required to be sufficiently strong.

Figure 4:
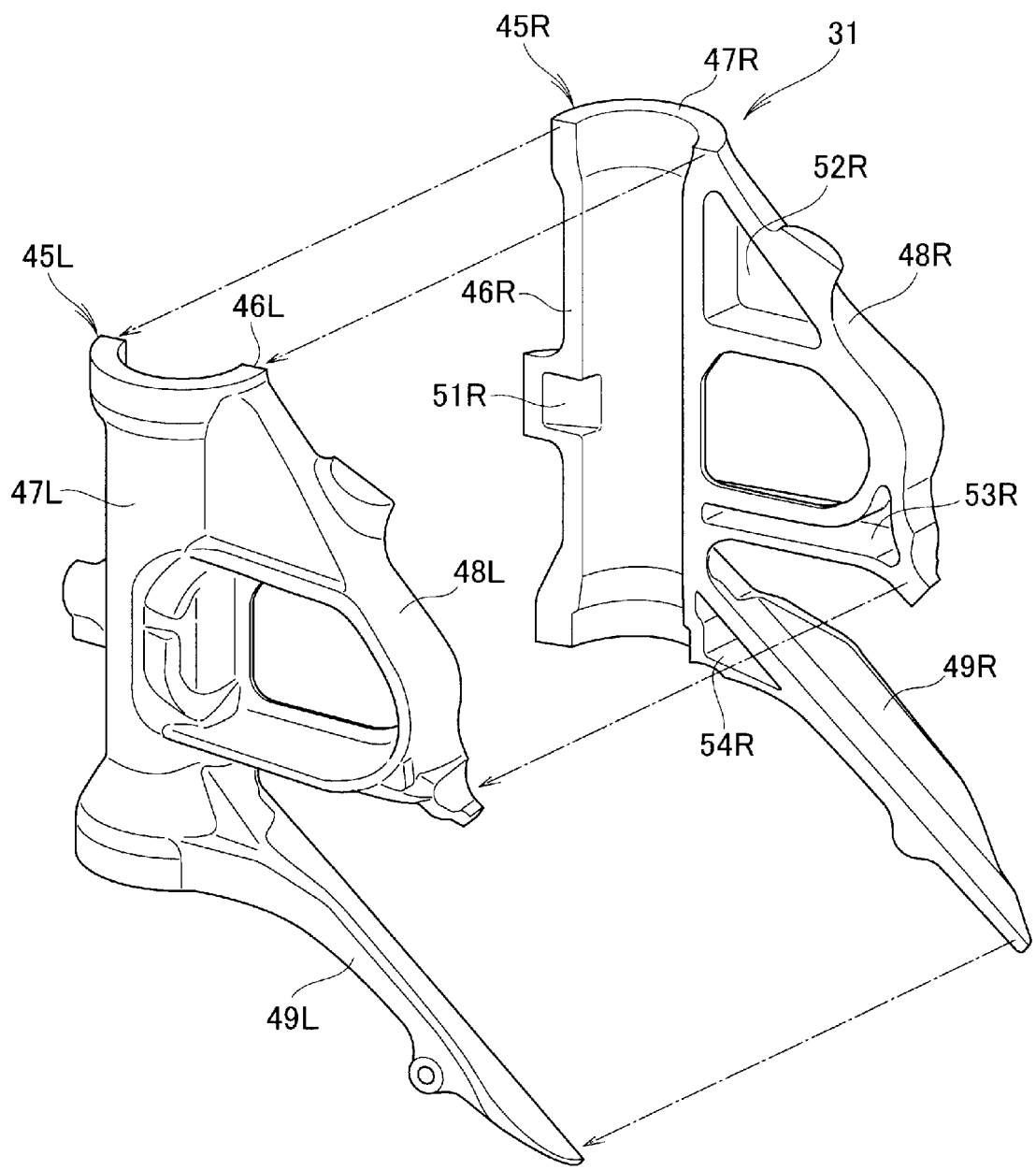
FIG. 4 is an exploded perspective view of the head pipe.

As shown in FIG. 4, the head pipe 31 includes a left half 45L, obtained by die forming, and a right half 45R obtained by die forming.

The left half 45L is a half of the head pipe 31 divided at a left joining surface 46L and includes: the left steering support sleeve 47L; a left main frame support socket 48L extending toward the rear of the vehicle from this left steering support sleeve 47L; and a left down-frame gusset 49L extending obliquely downward and toward the rear of the vehicle from a lower portion of the left steering support sleeve 47L.

Similarly, the right half 45R is a half of the head pipe 31 divided at a right joining surface 46R and includes: the right steering support sleeve 47R; a right main frame support socket 48R extending toward the rear of the vehicle from this right steering support sleeve 47R; and a right down-frame gusset 49R extending obliquely downward and toward the rear of the vehicle from a lower portion of the right steering support sleeve 47R.

Further, a right first hollow portion 51R is bored in the right steering support sleeve 47R. A right second hollow portion 52R and a right third hollow portion 53R are bored in the right main frame support socket 48R. A right fourth hollow portion 54R is bored in the right down-frame gusset 49R. The right first to fourth hollow portions 51R to 54R are each bored in such a way as to have an opening at the right joining surface 46R. The position and the number of each of the right first to fourth hollow portions 51R to 54R may be any suitable position and number.

The right first to fourth hollow portions 51R to 54R have their openings at the right joining surface 46R, and are therefore not visible from the outside once the left half 45L is joined to the right half 45R in the next step. The exterior appearance is enhanced and mud and dirt are unlikely to accumulate in the right first to fourth hollow portions 51R to 54R as well.

For the sake of illustration, left first to fourth hollow portions are not shown but are bored in the left half 45L. Thus, it is possible to greatly reduce the weight of the left and right halves 45L, 45R and maintain the exterior appearance at the same time.

The die forming of the left and right halves 45L, 46R will be specifically described with reference drawings.

Figure 5:
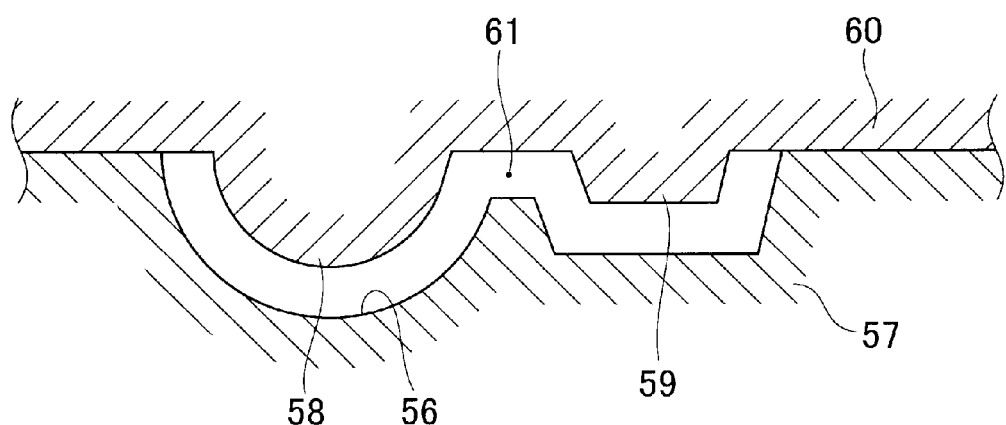
FIG. 5 is a view for describing a manufacturing method using casting.

As shown in FIG. 5, a lower die 57 having a cavity concave portion 56 and an upper die 60 having a semi-circular column-shaped protrusion 58 and a hollow-portion forming protrusion 59 are prepared. The upper die 60 is placed on the lower die 57 (die assembling), and molten metal (hot metal) is poured into a cavity 61. Once the molten metal solidifies, the upper die 60 is separated from the lower die 57, and the resultant cast part is taken out. As a result, left and right halves (FIG. 4, 45L, 45R) manufactured by casting are obtained. With a casting method, it is possible to manufacture left and right halves (FIG. 4, 45L, 45R) having complicated shapes.

Figure 6:
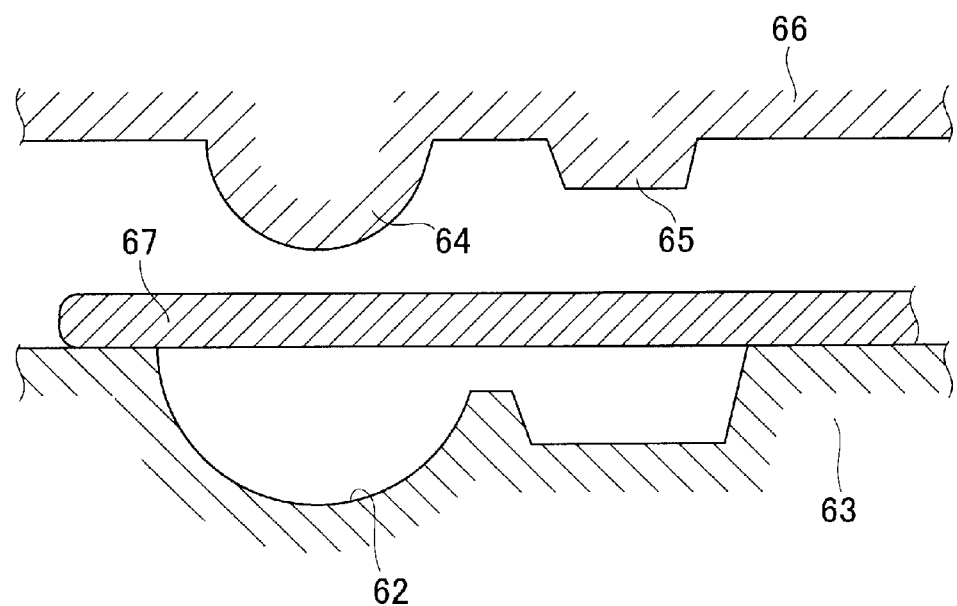
FIG. 6 is a view for describing a manufacturing method using forging.

Alternatively, as shown in FIG. 6, a die 63 having a forming concave portion 62 and a punch 66 having a semi-circular column-shaped protrusion 64 and a hollow-portion forming protrusion 65 are prepared. A metal material 67 is placed (loaded) on the die 63, and the punch 66 is lowered to perform plastic working. The punch 66 is raised, and the resultant forged part is taken out. As a result, left and right halves (FIG. 4, 45L, 45R) manufactured by forging are obtained.

Meanwhile, in the case of cold forging, the metal material 67 at normal temperature is loaded and, in the case of hot forging, the metal material 67 is heated to a hot forging temperature and then loaded. Hot forging is recommended since the left and right halves (FIG. 4, 45L, 45R) of the present invention have somewhat complicated shapes.

Figure 7:
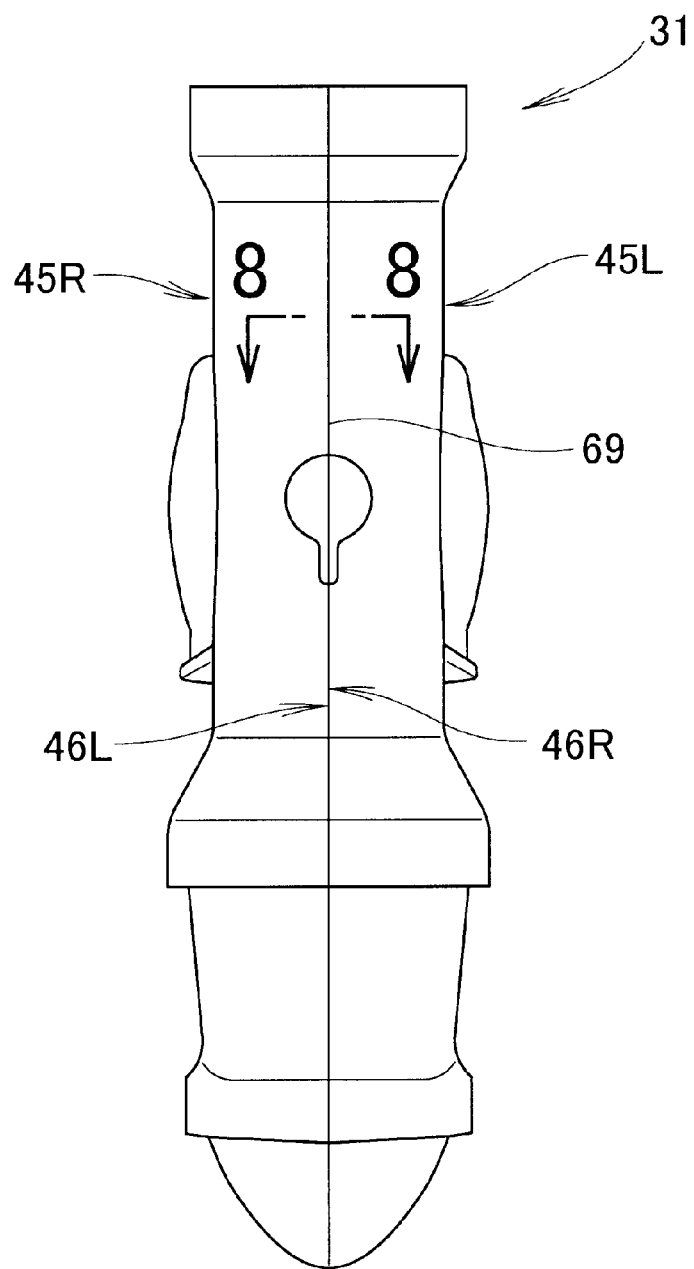
FIG. 7 is a front view of the head pipe before welding.

Referring to FIG. 4 (which is a front view, thus showing L and R as right and left, respectively), the right half 45R is brought into contact with the left half 45L, so that the head pipe 31 as a semi-completed product as shown in FIG. 7 (the head pipe 31 before welding) is obtained. In the front view, a small clearance (gap) 69 is visible between the left joining surface 46L and the right joining surface 46R.

Figure 8:
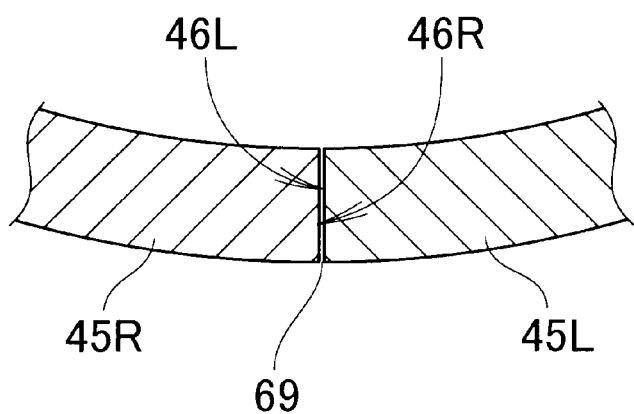
FIG. 8 is a cross-sectional view taken along a line 8-8 in FIG. 7.

As shown in FIG. 8, which is a cross-sectional view taken along a line 8-8 in FIG. 7, the clearance 69 appears inevitably, but this clearance 69 is made as small as possible (to 0.01 mm or less, for example). If the left joining surface 46L and/or the right joining surface 46R have/has warpage or irregularities after the casting or forging, it is recommended to smooth and flatten the left joining surface 46L and/or the right joining surface 46R by machining, polishing or the like. This process makes the clearance 69 as small as possible (to 0.01 mm or less, for example).

Figure 9A:
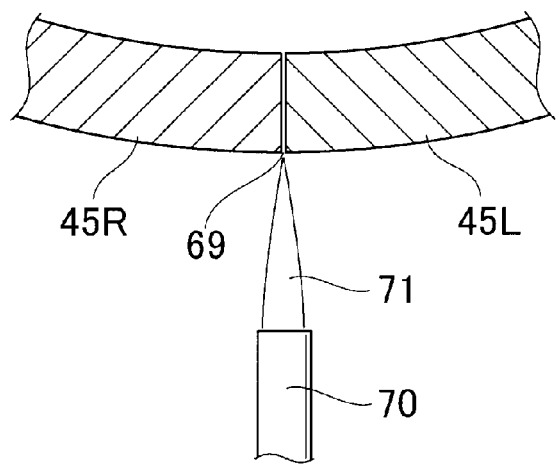
FIGS. 9A and 9B are views for describing laser welding, where in FIG. 9A shows a view in which a laser beam from a laser welding torch is applied to an assembled head pipe.

Then, as shown in FIG. 9A, a laser beam 71 from a laser welding torch 70 is applied to the assembled head pipe at the clearance 69. The laser beam 71 has a significantly higher energy density than arc heat, and effectively heats the portion around the clearance 69 to temperatures above the melting point.

Figure 9B:
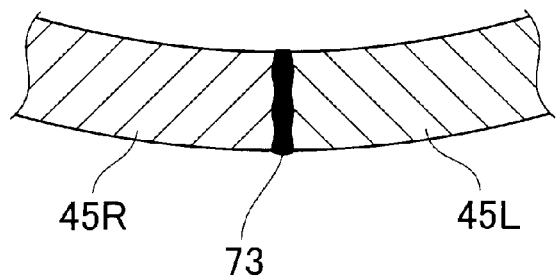

As a result, as shown in FIG. 9B, a first bead 73 having a large aspect ratio (depth/width) is formed. Thus, the left half 45L and the right half 45R are firmly joined by this first bead 73.

Figure 10:
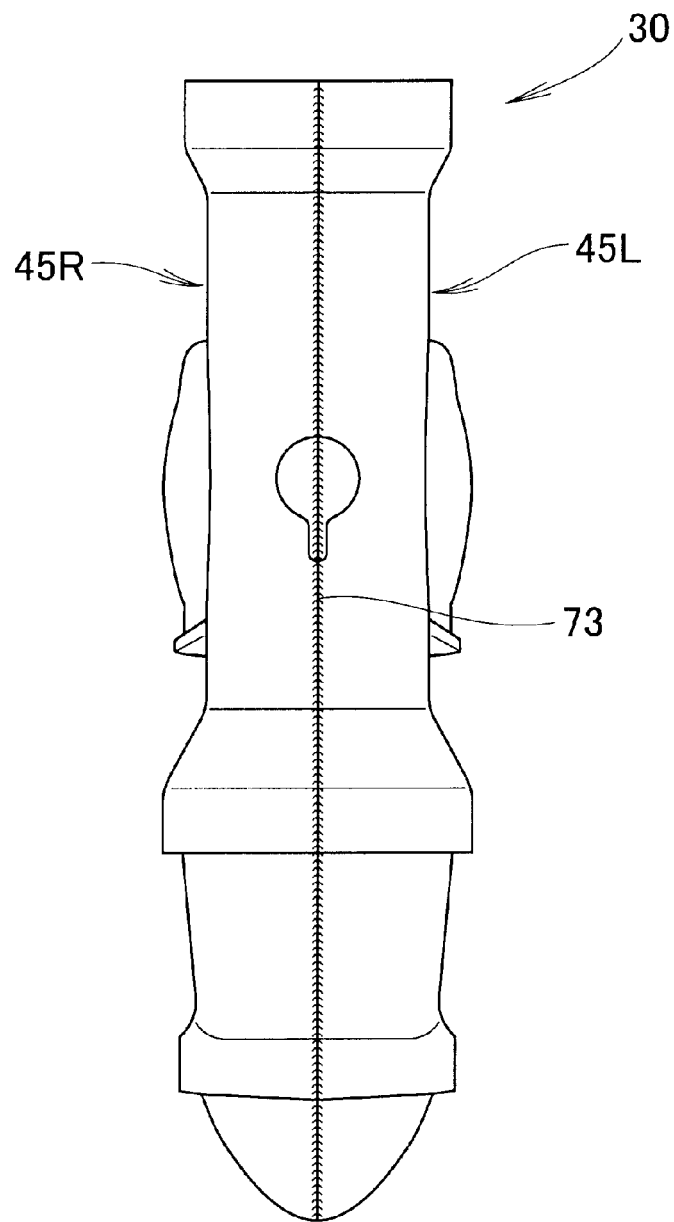
FIG. 10 is a front view of the head pipe after welding.

By the above steps, as shown in FIG. 10, the left half 45L and the right half 45R are integrated by the first bead 73. This first bead 73 is a laser weld bead as mentioned above.

Figure 11:
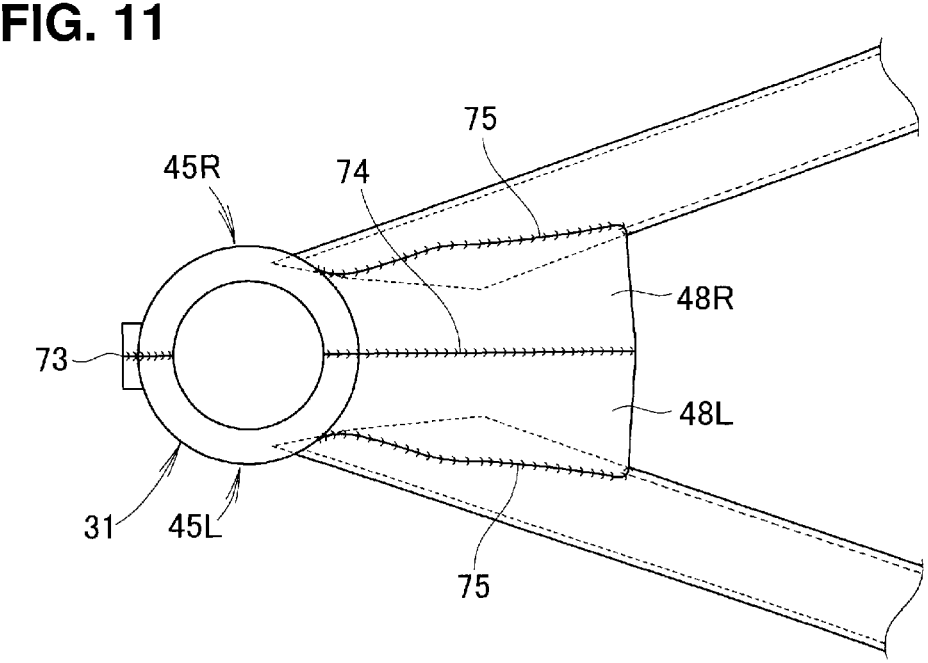
FIG. 11 is a plan view of a front section of the vehicle body frame.

As shown in FIG. 11, the left and right main frame support sockets 48L, 48R are similarly joined by a second bead 74. This second bead 74 is a laser weld bead as well.

The head pipe 31 is formed by joining the left half 45L and the right half 45R with the first and second beads 73, 74, which are laser weld beads. Laser weld beads are significantly smaller in bead width than arc weld beads, and therefore their shrinkage, after cooling and solidification, is significantly smaller. As a result, a head pipe 31 having good dimensional accuracy is obtained. This process also leads to a head pipe with consistently reproducible dimensions, which facilitates manufacturing operations.

Housing portions for the bearings 41, 42 shown in FIG. 3 are formed by machining the left and right steering support sleeves 47L, 47R of the head pipe 31. Here, since the dimensional accuracy of the head pipe 31 after the welding is good, the machining allowance can be reduced. Accordingly, it is possible to increase the material yield and reduce the working man-hours at the same time.

Note that the shrinkage after the solidification is not zero, but the shrinkage occurs in the vehicle width direction (top-bottom direction in FIG. 11) and does not occur in the vehicle length direction. For this reason, in FIG. 2, the distance between the head pipe 31 and the pivot shaft 33 is unlikely to change.

Then, the tips of the left and right main frames 32L, 32R are brought into contact with the left and right main frame support sockets 48L, 48R and joined thereto with third beads 75, 75, respectively. Each third bead 75 does not necessarily have to be a laser weld bead and may be an arc weld bead using TIG, MIG, or the like. In the case of arc welding, the operation can be done even if the clearance well exceeds 0.01 mm. Thus, the welding man-hours can be reduced.

Referring to FIG. 2, the down frame 35, having an angular tube shape (disposed at an angle with respect to a central axis of the head pipe 31), is placed on the left and right down-frame gussets 49L, 49R and joined thereto with a fourth bead 76. This fourth bead 76 may also be any one of a laser weld bead and an arc weld bead using TIG, MIG, or the like.

Next, a modification of the head pipe 31 will be described.

The left and right main frame support sockets 48L, 48R of a head pipe 31 shown in FIG. 12 each have a tubular shape as will be described with reference to FIG. 13, and a down-frame support socket 78 has a squared-off tubular shape, as will be described with reference to FIG. 14.

Figure 12:
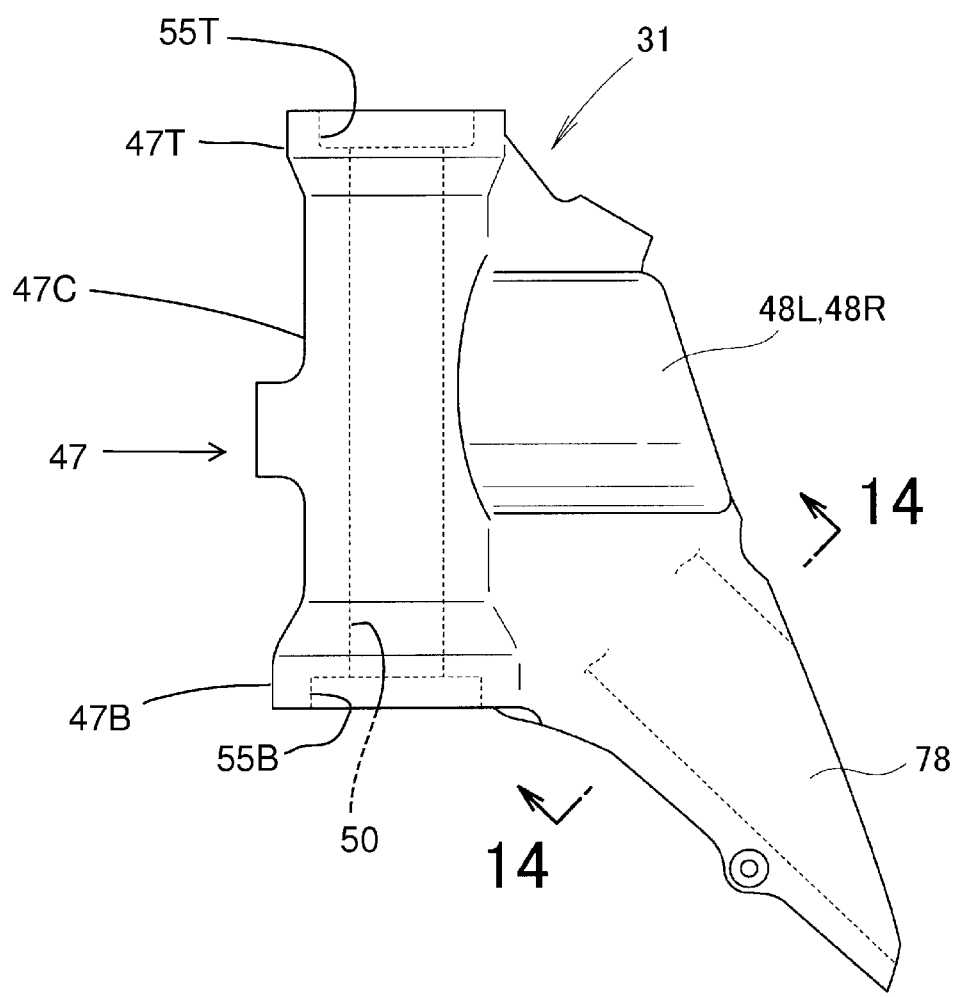
FIG. 12 is a left-side view showing a modification of the head pipe.

As shown in FIG. 12, the steering support sleeve 47 includes a central portion 47C, an upper end portion 47T and a lower end or base portion 47B. The steering support sleeve 47 also has a hollow central bore 50 formed therein to receive the steering shaft 12. Each of the upper end portion 47T and the lower end portion 47B has a hollow annular bearing seat 55T, 55B respectively formed therein to receive a bearing, where the bearing seat is wider than the central bore 50, as shown.

Figure 13:
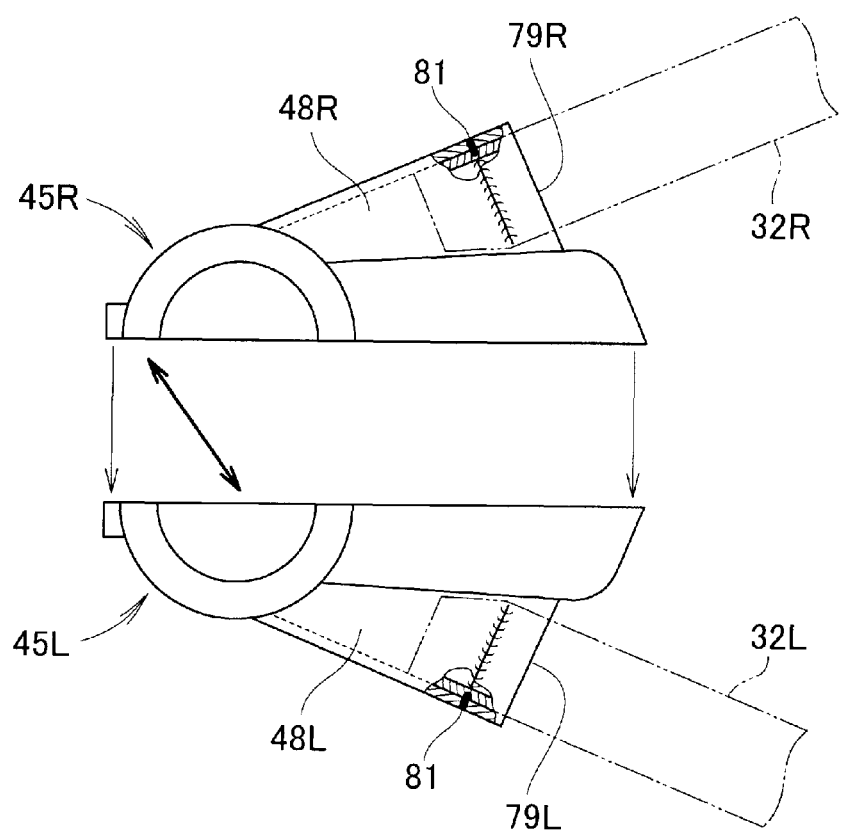
FIG. 13 is an exploded view of the head pipe according to the modification.

As shown in FIG. 13, the left and right halves 45L, 45R of the head pipe 31 have left and right insertion holes 79L, 79R respectively formed therein, into which the left and right main frames 32L, 32R can be inserted from the rear of the vehicle.

An arrow 80 indicates a direction in which a die is separated, and also a direction in which a punch is moved. That is, although the left main frame support socket 48L has a tubular shape, the casting or forging thereof is effectively made possible by separating the die or moving the punch along the arrow 80. The same applies to the right main frame support socket 48R.

The left and right main frames 32L, 32R are inserted (preferably, lightly press-fitted) into the left and right insertion holes 79L, 79R and are then fixed thereto with fifth beads 81, 81. A laser welding beam is preferable for each fifth bead 81. A laser welding beam has an extremely high energy density, and is therefore capable of penetrating the left and right main frame support sockets 48L, 48R on the outer side and melt the left and right main frames 32L, 32R on the inner side. In this way, the left and right main frames 32L, 32R are lap-welded to the left and right main frame support sockets 48L, 48R. With the lap welding in this direction, no shrinkage occurs in the vehicle length direction during the solidification.

Figure 14:
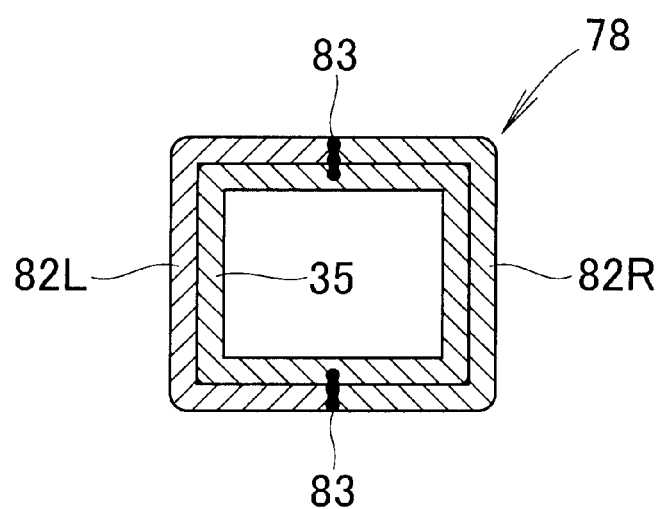
FIG. 14 is a cross-sectional view taken along a line 14-14 in FIG. 12.

The head pipe 31 shown in FIG. 12 includes a left square-U-shaped cross-section part 82L and a right square-U-shaped cross-section part 82R as shown in FIG. 14 at its lower section. The left and right square-U-shaped cross-section parts 82L, 82R are brought into contact with each other to make a rectangular cross section, into which the down frame 35 is inserted. The portions around the clearance are melted with a laser beam. Thus, the left and right square-U-shaped cross-section parts 82L, 82R can be joined to each other and the down frame 35 is fixed thereto by sixth beads 83, 83. In this welding, too, shrinkage occurs in the vehicle width direction but does not occur in the vehicle length direction.

The present invention is preferable as a vehicle body frame for a motorcycle.

However, the present invention can be adapted not only for a motorcycle, but is also applicable also other saddle-ride vehicles which use a head pipe, such as a three-wheeled or four-wheeled all-terrain vehicle.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

DESCRIPTION OF REFERENCE NUMBERS

10 Motorcycle
11 Front Wheel
12 Steering Shaft
13 Rear Wheel
14 Swing Arm
15 Engine
30 Vehicle Body Frame
31 Head Pipe
32 Main Frame
32L Left Main Frame
32R Right Main Frame
33 Pivot Shaft 34 Pivot Frame
34L Left Pivot Frame
34R Right Pivot Frame
35 Down Frame
45L Left Half
45R Right Half
46L Left Joining Surface
46R Right Joining Surface
47L Left Steering support sleeve
47R Right Steering support sleeve
48L Left Main frame support socket
48R Right Main frame support socket
51R to 54R Right Hollow Portions
73 Bead (First Bead)
74 Bead (Second Bead)
78 Down-frame support socket
79L Left Insertion Hole
79R Right Insertion Hole
82L Left Square-U-Shaped Cross-Section Part
82R Right Square-U-Shaped Cross-Section Part

What is claimed is:

1. A vehicle body frame for a saddle-ride vehicle, said vehicle body frame comprising:
a head pipe configured to pivotally receive a steering shaft therein;
at least one main frame having a front end welded to the head pipe, the at least one main frame extending rearwardly from the front end thereof; and
a pivot frame having a front end which is connected to a rear portion of the at least one main frame, and which is configured to support a swing arm thereon,
wherein:
the head pipe comprises a left half which is formed by die forming, a right half which is formed by die forming, and a bead formed by laser welding interconnecting the right half and the left half of the head pipe, and
the left half and the right half of the head pipe, respectively, include a left main-frame support socket and a right main-frame support socket each configured to receive a tip portion of the at least one main frame therein, and a left steering support sleeve and a right steering support sleeve each configured to support the steering shaft therein, the left and right main-frame support sockets and the left and right steering support sleeves formed by the die forming which forms the left half and right half of the head pipe.

2. The vehicle body frame for a saddle-ride vehicle according to claim 1, wherein the left half and the right half of the head pipe are formed by casting.

3. The vehicle body frame for a saddle-ride vehicle according to claim 1, wherein the left half and the right half of the head pipe are formed by forging.

4. The vehicle body frame for a saddle-ride vehicle according to claim 1, wherein the left half and the right half of the head pipe each have a respective joining surface side configured to be joined to each other, and each joining surface side has hollow portions formed therein.

5. The vehicle body frame for a saddle-ride vehicle according to claim 1, wherein
said at least one main frame includes a left main frame and a right main frame,
the left main-frame support socket provided in the left half of the head pipe has a left insertion hole formed therein configured to receive a tip portion of the left main frame, and
the right main-frame support socket provided in the right half of the head pipe has a right insertion hole formed therein configured to receive a tip portion of the right main frame.

6. The vehicle body frame for a saddle-ride vehicle according to claim 1, wherein
the left half and the right half of the head pipe each include a lower section having located therein respectively, a left square-U-shaped cross-section part and a right square-U-shaped cross-section part, and
a down-frame support socket for receiving a tip of a down frame is formed by joining the left square-U-shaped cross-section part to the right square-U-shaped cross-section part by laser welding.

7. The vehicle body frame for a saddle-ride vehicle according to claim 1, wherein each of the left and right steering support sleeves comprises a central portion, an upper end portion and a lower end portion, and has a hollow central bore formed therein, and
each of the upper end portions and the lower end portions of the left and right steering support sleeves has a bearing seat formed therein to receive a bearing, where the bearing seat is wider than the central bore.

8. The vehicle body frame for a saddle-ride vehicle according to claim 7, wherein each of the left half and the right half of the head pipe has a down-frame gusset attached to and formed integrally with each of the left and right steering support sleeves respectively, the down-frame gusset extending obliquely downward and rearwardly from the respective steering support sleeve.

9. A vehicle body frame for a saddle-ride vehicle, said vehicle body frame comprising:
a head pipe configured to pivotally receive a steering shaft therein;
a left main frame and a right main frame, each having a front end which is welded to the head pipe, the left and right main frames extending rearwardly from their respective front ends; and
a left pivot frame and a right pivot frame, each having a front end which is connected to a rear portion of the respective left and right main frames, and configured to support a swing arm thereon,
wherein:
the head pipe comprises a left half which is formed by die forming, a right half which is formed by die forming, and a bead formed by laser welding interconnecting the right half and the left half of the head pipe,
the left half and the right half of the head pipe, respectively, include a sleeve section configured to receive the steering shaft therein, the sleeve section having a central portion, an upper end portion and a lower end portion, each of the upper end portion and the lower end portion being wider than the central portion and having a bearing seat formed therein to receive a bearing, and
the left half and the right half of the head pipe, respectively, include a left main-frame support socket and a right main-frame support socket,
the left main-frame support socket provided in the left half of the head pipe has a left insertion hole formed therein configured to receive a tip portion of the left main frame, and
the right main-frame support socket provided in the right half of the head pipe has a right insertion hole formed therein configured to receive a tip portion of the right main frame.

10. The vehicle body frame for a saddle-ride vehicle according to claim 9, wherein the left half and the right half of the head pipe are formed by casting.

11. The vehicle body frame for a saddle-ride vehicle according to claim 9, wherein the left half and the right half of the head pipe are formed by forging.

12. The vehicle body frame for a saddle-ride vehicle according to claim 9, wherein the left half and the right half of the head pipe each have a respective joining surface side configured to be joined to each other, and each joining surface side has hollow portions formed therein.

13. The vehicle body frame for a saddle-ride vehicle according to claim 9, wherein
- the left half and the right half of the head pipe each include a lower section having located therein respectively, a left square-U-shaped cross-section part and a right square-U-shaped cross-section part, and
- a down-frame support socket for receiving a tip of a down frame is formed by joining the left square-U-shaped cross-section part to the right square-U-shaped cross-section part by laser welding.

14. The vehicle body frame for a saddle-ride vehicle according to claim 9, wherein each of the left half and the right half of the head pipe has a down-frame gusset attached to the sleeve section and formed integrally therewith, the down-frame gusset extending obliquely downward and rearwardly from the sleeve section.

15. A motorcycle comprising a vehicle body frame which comprises:
- a head pipe having a hollow central bore formed therein configured to pivotally receive a steering shaft therein;
- a left main frame and a right main frame, each having a front end which is welded to the head pipe, the left and right main frames extending rearwardly from the respective front ends thereof; and
- a left pivot frame and a right pivot frame, each having a front end which is connected to a rear portion of the respective left and right main frames, and configured to support a swing arm thereon, wherein:
- the head pipe comprises a left half which is formed by die forming, a right half which is formed by die forming, and a bead formed by laser welding interconnecting the right half and the left half of the head pipe,
- the left half and the right half of the head pipe, respectively, include a sleeve section configured to receive the steering shaft therein, the sleeve section having a central portion, an upper end portion and a lower end portion, each of the upper end portion and the lower end portion being wider than the central portion and having a bearing seat formed therein to receive a bearing, and
- the left half and the right half of the head pipe, respectively, include a left main-frame support socket and a right main-frame support socket,
- the left main-frame support socket provided in the left half of the head pipe has a left insertion hole formed therein configured to receive a tip portion of the left main frame, and
- the right main-frame support socket provided in the right half of the head pipe has a right insertion hole formed therein configured to receive a tip portion of the right main frame.

16. The motorcycle according to claim 15, wherein the left half and the right half of the head pipe are formed by casting.

17. The motorcycle according to claim 15, wherein the left half and the right half of the head pipe are formed by forging.

18. The motorcycle according to claim 15, wherein the left half and the right half of the head pipe each have a respective joining surface side configured to be joined to each other, and each joining surface side has hollow portions formed therein.

19. The motorcycle according to claim 15, wherein
- the left half and the right half of the head pipe each include a lower section having located therein respectively, a left square-U-shaped cross-section part and a right square-U-shaped cross-section part, and
- a down-frame support socket for receiving a tip of a down frame is formed by joining the left square-U-shaped cross-section part to the right square-U-shaped cross-section part by laser welding.

20. The motorcycle according to claim 15, wherein each of the left half and the right half of the head pipe has a down-frame gusset attached to the sleeve section and formed integrally therewith, the down-frame gusset extending obliquely downward and rearwardly from the sleeve section.

* * * * *